United States Patent
Singh et al.

(10) Patent No.: US 8,458,382 B2
(45) Date of Patent: *Jun. 4, 2013

(54) SMART CARD SET PROTOCOL OPTIMIZATION

(75) Inventors: Ravi Singh, Toronto (CA); Neil Patrick Adams, Waterloo (CA); Dinah Lea Marie Davis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,675

(22) Filed: Jul. 26, 2012

(65) Prior Publication Data

US 2012/0297093 A1    Nov. 22, 2012

Related U.S. Application Data

(63) Continuation of application No. 13/108,639, filed on May 16, 2011, now Pat. No. 8,244,920, which is a continuation of application No. 11/777,680, filed on Jul. 13, 2007, now Pat. No. 7,945,704.

(51) Int. Cl.
*G06F 5/00* (2006.01)
*H04N 7/16* (2006.01)

(52) U.S. Cl.
USPC .................................. 710/58; 725/6; 902/26

(58) Field of Classification Search
None
See application file for complete search history.

(56) References Cited

U.S. PATENT DOCUMENTS

| 6,018,717 | A | 1/2000 | Lee et al. |
| 7,418,524 | B2 * | 8/2008 | Beasley et al. ................. 710/2 |
| 2003/0178482 | A1 | 9/2003 | Kisliakov |
| 2008/0017711 | A1 * | 1/2008 | Adams et al. ................ 235/439 |

OTHER PUBLICATIONS

Jevtic, Nenad, Second Office Action for CA 2,593,592, Feb. 14, 2012.

* cited by examiner

*Primary Examiner* — Idriss N Alrobaye
*Assistant Examiner* — Richard B Franklin
(74) *Attorney, Agent, or Firm* — Integral Intellectual Property Inc.; Miriam Paton

(57) ABSTRACT

A method of facilitating communications between a computer device and a smart card reader having an associated smart card, the computer device including a smart card resource manager and a smart card reader service, the smart card reader service acting as a relay for commands between the smart card resource manager and the smart card reader, the method comprising: receiving from the smart card resource manager a first command for setting a protocol for communications with the smart card; and responding, prior to receiving a reply from the smart card to the first command, to the smart card resource manager with a message indicating that the smart card has successfully received the first command.

21 Claims, 9 Drawing Sheets

SMART CARD SET PROTOCOL OPTIMIZATION

CROSS-REFERENCE TO RELATED APPLICATIONS

The present application is a continuation of U.S. patent application Ser. No. 13/108,639, filed on May 16, 2011, which is expected to issue as U.S. Pat. No. 8,244,920 on Aug. 14, 2012, which in turn is a continuation of U.S. patent application Ser. No. 11/777,680, filed Jul. 13, 2007, which issued as U.S. Pat. No. 7,945,704 on May 17, 2011 the contents of which are hereby incorporated herein by reference.

TECHNICAL FIELD

The present application relates generally to smart card readers and, in particular, to communications between a smart card reader and a computer system.

BACKGROUND

Smart card readers are used in a variety of applications, for example in combination with handheld devices and personal computers for security related purposes.

Some operating systems (such as Microsoft® Windows® Vista™) installed in personal computers include a generic or multipurpose smart card resource manager. Third party vendors may also provide their own smart card readers, which may thus require their own smart card reader drivers to be installed for use with the operating system. In such instances, the smart card resource manager may communicate with the vendor specific smart card reader driver first in order to access or communicate with the smart card reader.

Improved efficiencies in communications between smart card resource managers, smart card reader drivers and smart card readers are desirable.

BRIEF DESCRIPTION OF THE DRAWINGS

Reference will now be made to the drawings, which show by way of example, embodiments of the present disclosure, and in which.

DETAILED DESCRIPTION

Figure 1:
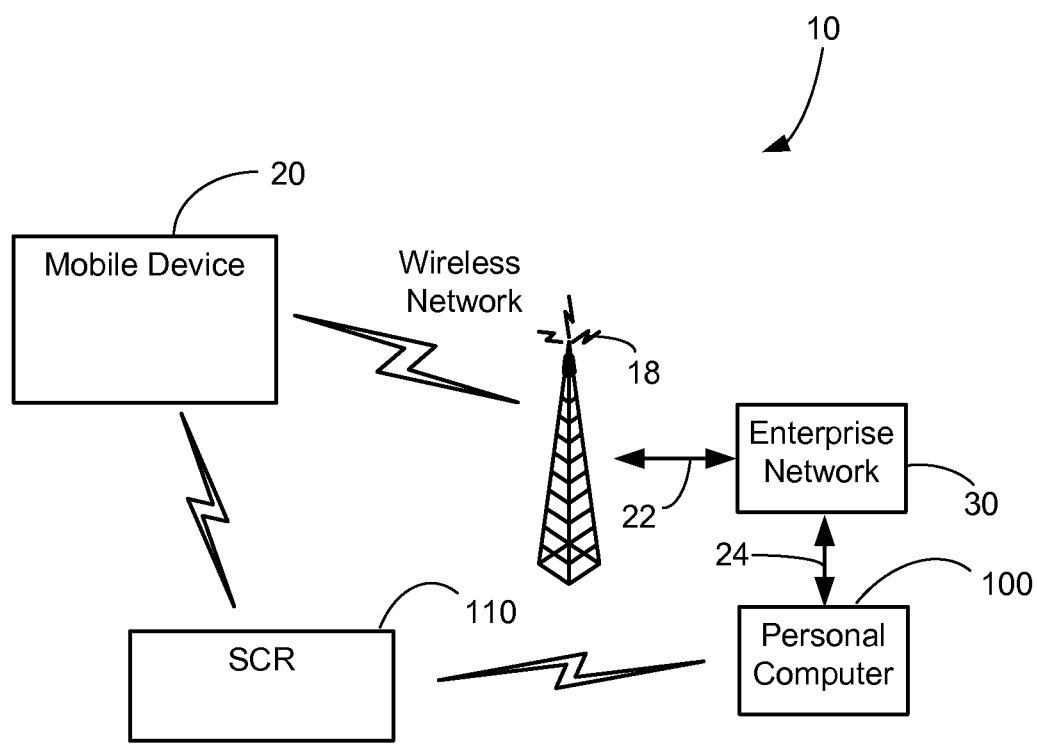
FIG. 1 shows in block diagram form a communication system suitable for a smart card reader and personal computer in accordance with one embodiment.

According to one example embodiment there is provided a method of facilitating communications between a computer device and a smart card reader having an associated smart card for use in login authentication, the computer device including a smart card resource manager and a smart card reader service, the smart card reader service acting as a relay for commands between the smart card resource manager and the smart card reader, the method comprising: receiving from the smart card resource manager a first command for setting a protocol for communications with the smart card; and responding, prior to receiving a reply from the smart card to the first command, to the smart card resource manager with a message indicating that the smart card has successfully received the first command. According to an example embodiment there is provided a computer program product comprising a computer readable medium having recorded thereon statements and instructions for execution by a computer to carry out the method.

According to an example embodiment there is provided a computer device for communicating over a wireless communications link with a smart card reader having an associated smart card for use in login authentication, the computer device comprising: a smart card resource manager for generating commands for the smart card reader; and a smart card reader service for relaying commands received from the smart card resource manager for the smart card reader. The smart card reader service is configured to: receive from the smart card resource manager a first command for setting a protocol for communications with the smart card; and respond, prior to receiving a reply from the smart card to the first command, to the smart card resource manager with a message indicating that the smart card has successfully received the first command.

According to an example embodiment there is provided a smart card reader comprising: a smart card interface for receiving a smart card; a communications system for exchanging signals over a wireless link with an associated computer; and a controller connected to the smart card interface and the communications system for exchanging signals therewith. The controller is configured to: send a smart card insertion message to the associated computer; receive a first command and a second command from the associated computer, wherein the first command comprises a command to set a protocol for communications with the smart card; provide the first command to the smart card; and receive an indication from the smart card of whether the first command failed; if the first command failed at the smart card, then send the associated computer a response indicating that the second command failed; and if the first command did not fail at the smart card, then provide the second command to the smart card, receive a response to the second command from the smart card and send the response to the associated computer.

According to an example embodiment there is provided a system for login authentication comprising a computer device for communicating over a wireless link with a smart card reader having an associated smart card for use in login authentication, the computer device comprising: a smart card resource manager for generating commands for the smart card reader; a smart card reader service for relaying commands received from the smart card resource manager for the smart card reader. The smart card reader service is configured to: receive from the smart card resource manager a first command for setting a protocol for communications with the smart card; respond, prior to receiving a reply from the smart card to the first command, to the smart card resource manager with a message indicating that the smart card has successfully received the first command; relay the first command to the smart card reader; receive a second command from the smart card resource manager; relay the second command to the smart card reader through the wireless link; receive from the smart card reader through the wireless link a response to the second command; and relay the response to the smart card resource manager. The system also includes a smart card reader comprising: a smart card interface for receiving a smart card; a communications system for exchanging signals over the wireless link with the computer device; and a controller connected to the smart card interface and the communications system for exchanging signals therewith. The controller is configured to: receive the first command from the computer device and provide the first command to the smart card; receive an indication from the smart card of whether the first command failed; if the first command failed at the smart card, send the computer device a response indicating that the second command failed; and if the first command did not fail at the smart card, provide the second command to the smart card, receive a response to the second command from the smart card and send the response to the computer device.

As suggested above, some operating systems (such as Microsoft Windows Vista™) installed in personal computers include a generic or multipurpose smart card resource manager. Third party vendors may also provide their own smart card readers, and the vendors' own smart card reader drivers may be installed for use with the operating system. In such instances, the smart card resource manager may communicate with the vendor specific smart card reader driver first in order to access or communicate with the smart card reader. In other words, the vendor supplied smart card reader driver may merely act as a flow-through or relay of any instructions from the smart card resource manager to the smart card reader. A difficulty with such systems is that the smart card resource manager may expect a response to an issued command within a specified time from a smart cart reader, and depending on the operating environment the smart card reader may not be able to provide a response within the specified time, resulting in an unnecessary time out.

By way of example, consider the situation where smart card two factor authentication is required for a user to login to a computer in the Microsoft Windows Vista™ operating environment. When the user inserts a smart card into the smart card reader when the Microsoft Windows Vista™ login screen is active on a personal computer (PC) associated with the smart card reader, the Microsoft Windows Vista™ smart card resource manager will try and open a communications channel with the smart card that has been inserted into the reader. If the smart card resource manager is unable to properly communicate with the smart card, the user will get a message "No certificates Found on Smart Card" and the user will be unable to login to the computer (since login authentication requires the user's PC to access certificates on the smart card).

In the case of certain environments such as, for example, Microsoft Windows Vista™, when communication with a smart card is being established (such as during login authentication), an ISO 7816 compliant "SET PROTOCOL" command will be sent to the smart card reader to set the communication parameters used in communications between the smart card reader and the associated PC (for example, such communications parameters may include, among other things, baud rate, t=0 or t=1 communication, etc.). If the smart card reader does not respond within a set time limit, then the smart card resource manager will automatically abort its attempt to set up a communications channel with the smart card, resulting in a message such as "No certificates Found on Smart Card". Such a timeout may be appropriate in some PC/smart card reader configurations, for example when a wired link exists between the PC and the smart card reader and the amount of time the smart card has to respond to a SET PROTOCOL command is well defined by the ISO 7816 specification. However, in situations where a wireless link (for example, a Bluetooth™ link) exists between the smart card reader and the PC, the set amount of time provided by the smart card resource manager may not be sufficient, leading to unnecessary time outs.

Example embodiments of the present disclosure as described below may mitigate against unnecessary time outs such as described above.

Reference is first made to FIG. 1, which shows an illustrative communication system 10 to which embodiments described herein can be applied. The system 10 may include one or more mobile devices 20 (only one of which is shown in FIG. 1) that are enabled to communicate with one or more wireless networks 18. The wireless network 18 may be implemented as a packet-based and/or other type of cellular wide area wireless network that includes a number of base stations, each providing wireless Radio Frequency (RF) coverage to a corresponding area or cell. In some embodiments, instead of or in addition to a wide area wireless network, network 18 may include a local wireless area network, such as for example a wireless local area network that conforms to IEEE 802.11 standards such as 802.11b and/or 802.11g. In at least some example embodiments, the wireless network 18 is connected through intermediate communications links 22, including for example the Internet, to one or more enterprise networks 30, each associated with respective mobile devices 20, such that the mobile devices 20 are each enabled to exchange electronic messages and other information with the enterprise networks that they are associated with. At least some of the mobile devices 20 have a further associated secondary mobile device in the form of a smart card reader 110. Additionally, a user of the mobile device 20 and the smart card reader 110 will have access to a personal computer 100 that is connected to the enterprise network 30 over a communications link 24. In one embodiment, the communications link 24 is a local area network or wide area network providing organizational connectivity with the enterprise network 30. The smart card reader 110 may also be used with the personal computer 100, through either a wired or wireless connection.

Figure 2:
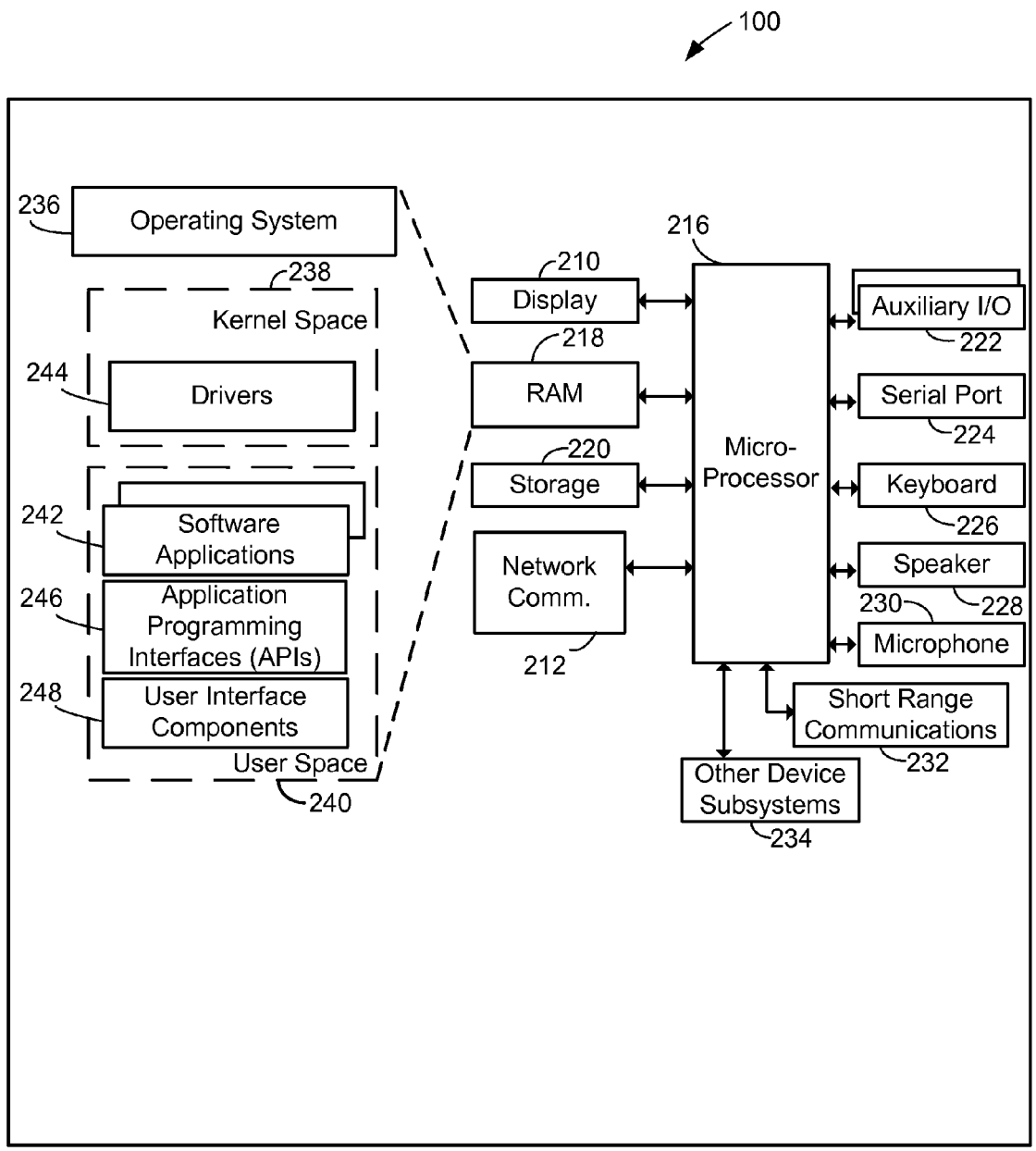
FIG. 2 shows an operational block representation of a personal computing device according to one embodiment.

Reference is next made to FIG. 2, which shows in greater detail an embodiment of the personal computer 100. The personal computer 100 includes a display sub-system 210 and a network communication subsystem 212 for two-way communications with the enterprise network 30 (FIG. 1). According to one embodiment, the communications subsystem 212 may include a wireless communications subsystem including antennas (not shown), RF transceivers (not shown), and some signal processing capabilities, implemented, for example, by a digital signal processor (not shown). According to another embodiment, the communications subsystem 212 may additionally or alternatively include a wired communications subsystem conforming to the well known Ethernet standard, including a 10 Mbps, 100 Mbps, or 1 Gbps Ethernet connection. The personal computer 100 also includes a controller in the form of at least one microprocessor 216 which is suitably programmed to control the overall operation and functions of the personal computer 100, which are described in more detail below. The personal computer 100 includes peripheral devices or subsystems such as a random access memory 218, a storage device 220 such as a hard disk drive, an auxiliary input/output (I/O) subsystem 222 (e.g., a mouse), a serial port 224 (e.g., a USB port), an input device 226 (e.g., a keyboard), a speaker 228, a microphone 230, a short-range communications subsystem 232 (e.g., an infrared transceiver, wireless bus protocol such as a Bluetooth™ system, or any other means of local wireless communications), and any other device subsystems generally designated by reference 234.

The microprocessor 216 operates under stored program control with code being stored in the storage device 220. As depicted in FIG. 2, while operational, the RAM 218 includes programs including an operating system program or code module 236, such as the Microsoft Windows Vista™ operating system. Operating systems such as Windows typically divide the RAM space 218 into two portions, namely a restricted access space such as a kernel space 238 and a user space 240, or functional equivalents thereof. The RAM 218 further includes software applications indicated generally by reference 242, which typically reside in the user space 240, and drivers 244, which typically reside in the kernel space 238. The user space further includes various application programming interfaces (APIs) 246 and various user interface (UI) components 248. The UI components 248 are the existing functions or routines provided by the operating system 236 that may be called by programs such as the software applications 242 in order to display elements of the graphical user interface to the user of the personal computer 100.

The operating system code 236, code for specific software applications 242, code for the drivers 244, code for the various application programming interfaces (APIs) 246, or code for the various user interface (UI) components 248 is permanently or semi-permanently stored on the storage device 220 and may be temporarily loaded into a volatile storage medium such as the RAM 218 during operation of the personal computer 100. Received communication signals and other data with information may also be stored in the RAM 218. Code for the specific device applications 242 or other elements of the user space 240 may be swapped back out to the storage device 220 as needed during operation of the personal computer 100, while code related to the kernel space 238 such as many aspects of the operating system code 236 and/or the drivers 244 is typically loaded into the RAM 218 upon boot-up of the personal computer 100 and is retained in the RAM 218 as long as the personal computer 100 remains powered up.

The stored program control (e.g. operating system 326, software applications 242) for the microprocessor 216 also includes a predetermined set of applications or code components or software modules that control basic device operations, for example, data and text communication applications which are normally installed on the personal computer 100 as the software applications 242 when the personal computer 100 is first configured. Further applications may also be loaded (i.e., downloaded) onto the personal computer 100 through the operation of networks described above for FIG. 1, the auxiliary I/O subsystem 222, the serial port 224, or the short-range communications subsystem 232. The downloaded code module or components are then installed by the user (or automatically) in the RAM 218 or the storage device 220.

The serial port 224 may comprise a USB type interface port for interfacing or synchronizing with another device. The short-range communications subsystem 232 provides a wireless interface for communication between the personal computer 100 and other devices, including the smart card reader 110, to be described in greater detail in connection with FIG. 3, below. For example, the subsystem 232 may comprise an infrared communication link or channel, a wireless bus protocol such as a Bluetooth™ communications subsystem, or any other suitable localized wireless means of communication.

Figure 3:
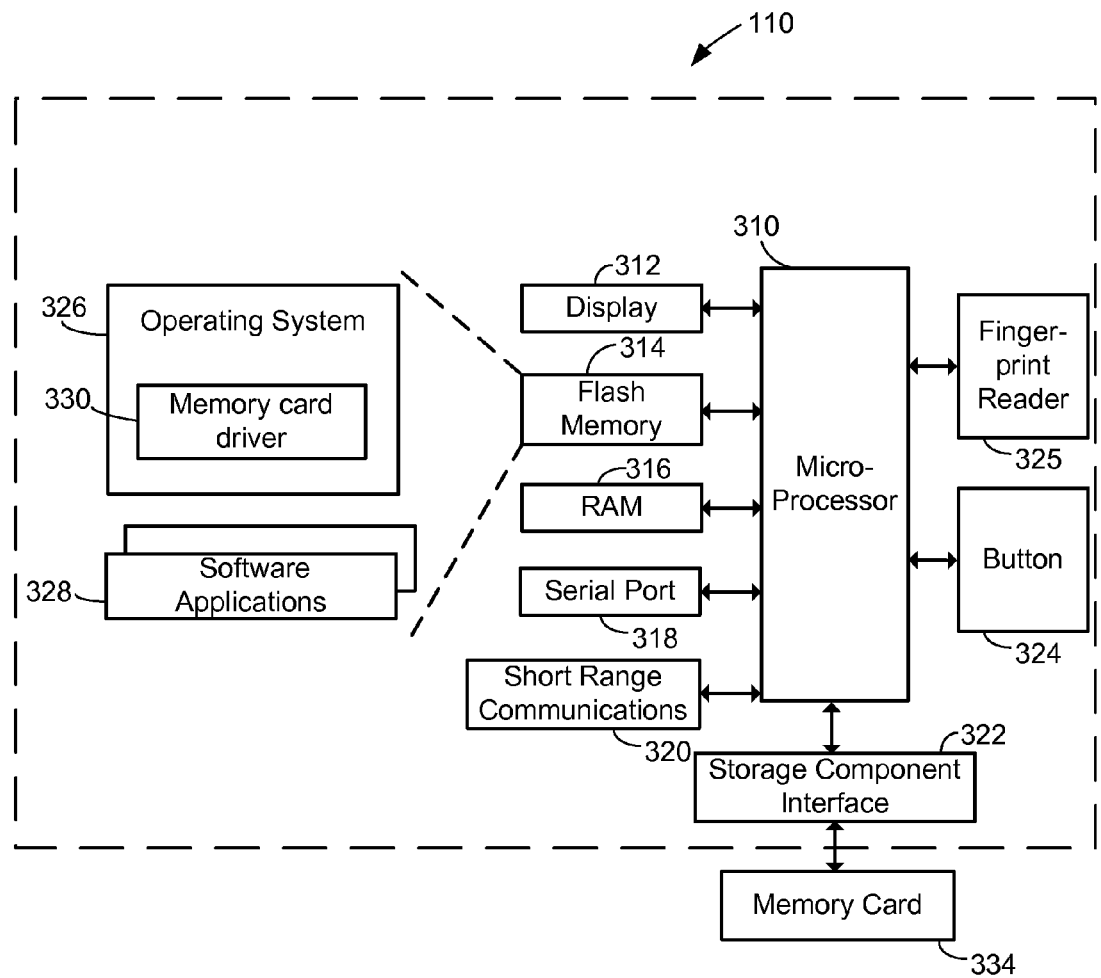
FIG. 3 shows an operational block representation of an embodiment of a smart card reader for use with the personal computing device shown in FIG. 2.

Reference is next made to FIG. 3, which shows in greater detail an example embodiment of a secondary mobile device, namely the smart card reader 110. The smart card reader 110 includes a controller including at least one microprocessor 310, which is suitably programmed to control the overall operation and functions of the smart card reader 110, and an output device (e.g., a display module 312). The smart card reader 110 further includes peripheral devices or subsystems such as a flash memory 314, a random access memory (RAM) 316, a serial port 318 (e.g., a USB port), a short-range communications subsystem 320 (e.g., an infrared transceiver, wireless bus protocol such as a Bluetooth system, or any other means of local communications), a storage component interface 322 (e.g., for a memory card or any other data storage device), a user input device 324 (e.g., a push button), and a biometric input device 325 (e.g., a fingerprint reader).

The microprocessor 310 operates under stored program control with code stored in the flash memory 314 (or other type of non-volatile memory device or devices). As depicted in FIG. 3, the stored programs include an operating system program or code module 326 and other programs or software applications indicated generally by reference 328. The operating system 326 of the smart card reader 110 further includes a memory card driver component 330. The memory card driver 330 is responsible for coordinating communications between the smart card reader 110 and a memory card 334 and/or between the smart card reader 110 and related drivers of a device to be used in conjunction with the smart card reader 110, such as the drivers 244 of the personal computer 100. The operating system code 326, code for specific software applications 328, code for the memory card driver 330, or code components thereof, may be temporarily loaded into a volatile storage medium such as the RAM 316. Received communication signals and other data with information may also be stored in the RAM 316. Additionally, the storage component interface 322 receives the removable memory card 334, providing additional storage space for the smart card reader 110. In one embodiment, the memory card 334 may be a smart card similar to the smart cards known to those skilled in the art. The memory card 334 may include security certificates (for user authentication, electronic signature, and/or encryption purposes), fingerprint authentication data, password or pin code related data, or other security related data. While operation of the smart card reader 110 is described using a smart card, it will be understood by those skilled in the art that the smart card reader 110 may be designed using any suitable form of removable media without departing from the intended scope of the smart card reader 110.

The stored program control (e.g. operating system 326, software applications 328) for the microprocessor 310 also includes a predetermined set of applications or code components or software modules that control basic device operations, for example, management and security related control of the data of the smart card reader 110 and may be installed on the smart card reader 110 as a component of the software applications 328 during the manufacturing process. Further applications may also be loaded (i.e., downloaded) onto the smart card reader 110 through the operation of the serial port 318, the short-range communications subsystem 320, or from the smart card 334. The downloaded code module or components are then installed by the user (or automatically) in the non-volatile program memory (e.g., the flash memory 314) or the RAM 316.

The serial port 318 may comprise a USB type interface port for interfacing or synchronizing with another device, such as, the personal computer 100 (FIG. 2), or the mobile device 20 (FIG. 1). The serial port 318 is used to exchange data with a device such as the personal computer 100 to be stored on the smart card 334 that is plugged into the storage component interface 322 of the smart card reader 110. The serial port 318 is also used to extend the capabilities of the smart card reader 110 by providing for information or software downloads, including any user interface information, to the smart card reader 110.

In various example embodiments, the short-range communications subsystem 320 provides a wireless interface for communication between the smart card reader 110 and the personal computer 100 or the mobile device 20. In one embodiment, the short-range communications subsystem 320 includes an infrared communication link or channel. In another embodiment, the subsystem 320 comprises a wireless RF bus protocol such as a Bluetooth™ communications subsystem. However, the short-range communications subsystem 320 may comprise any suitable local wireless means of communication, so long as the short range communications subsystem 232 of the personal computer 100 (FIG. 2) is compatible to facilitate wireless communication between the personal computer 100 and the smart card reader 110.

In order for the personal computer 100 to be able to properly communicate with the smart card reader 110, a suitable driver (hereinafter referred to as a smart card reader driver) can be loaded onto the personal computer 100 (e.g., as one of the drivers 244). For example, an operating system 236 such as Microsoft Windows Vista may be applied to or loaded onto the personal computer 100 and may include its own system supplied smart card reader driver.

Figure 4:
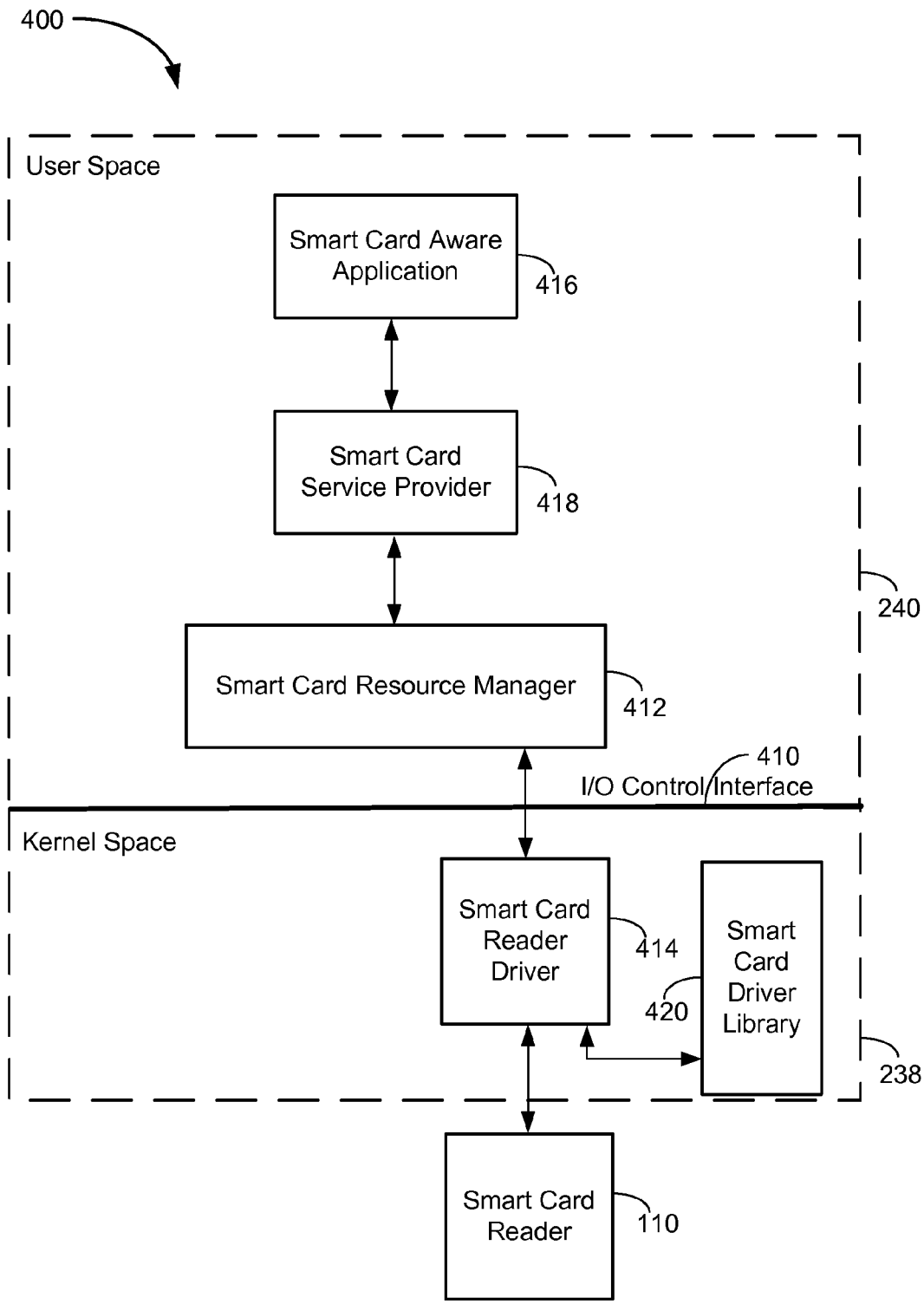
FIG. 4 shows in diagrammatic form a Microsoft Windows smart card environment.

For explanatory purposes, FIG. 4 illustrates a Microsoft Windows smart card environment 400, for example as described by the Windows Driver Development Kit (DDK). For purposes of facilitating an understanding of example embodiments of the present disclosure that are described further below, a brief description will now be provided of the different components of the Microsoft Windows Vista smart card environment 400, for communications with a smart card reader through a wired connection such as a Universal Serial Bus (USB) interface. The kernel space 238 and the user space 240 are indicated as shown in FIG. 4, with the interface between the kernel space 238 and the user space 240 referred to as an I/O control interface 410. Applications communicate with a smart card reader driver 414 by means of a smart card resource manager 412. In one example embodiment, the smart card reader driver 414 is a vendor supplied smart card reader driver supplied by the vendor of smart card reader 110 and resides in the kernel space 238. In some embodiments, the smart card reader driver 414 may be provided by the source of the operating system 236 (e.g. Microsoft™), rather than the vendor of the smart card reader 110. The smart card resource manager 412 resides in the user space 240. As shown, the smart card reader driver 414 communicates with the smart card reader 110. The resource manager 412 communicates with the smart card reader driver 414 by means of an I/O control function (i.e., the IOCTL( ) function) across the I/O control interface 410. The I/O control functions are dispatched using a DeviceIoControl system call. A smart card aware application 416 may send instructions to the smart card reader driver 414 by means of the system call DeviceIoControl, and the operating system forwards the indicated I/O control function to the smart card reader driver 414. I/O control functions initiated by the smart card aware applications 416 are passed to a smart card service provider 418, which passes the function to the smart card resource manager 412, which manages the resources related to the smart card reader 110 and may communicate with the smart card reader driver 414. The operating system forwards the request by means of an I/O request packet (IRP).

In some example embodiments, the smart card reader driver 414 is designed to work with the resource manager 412 and a smart card driver library 420 supplied with operating system 236. Thus, the smart card reader driver 414 may use the smart card driver library 420 to perform many of its key operations.

Figure 5:
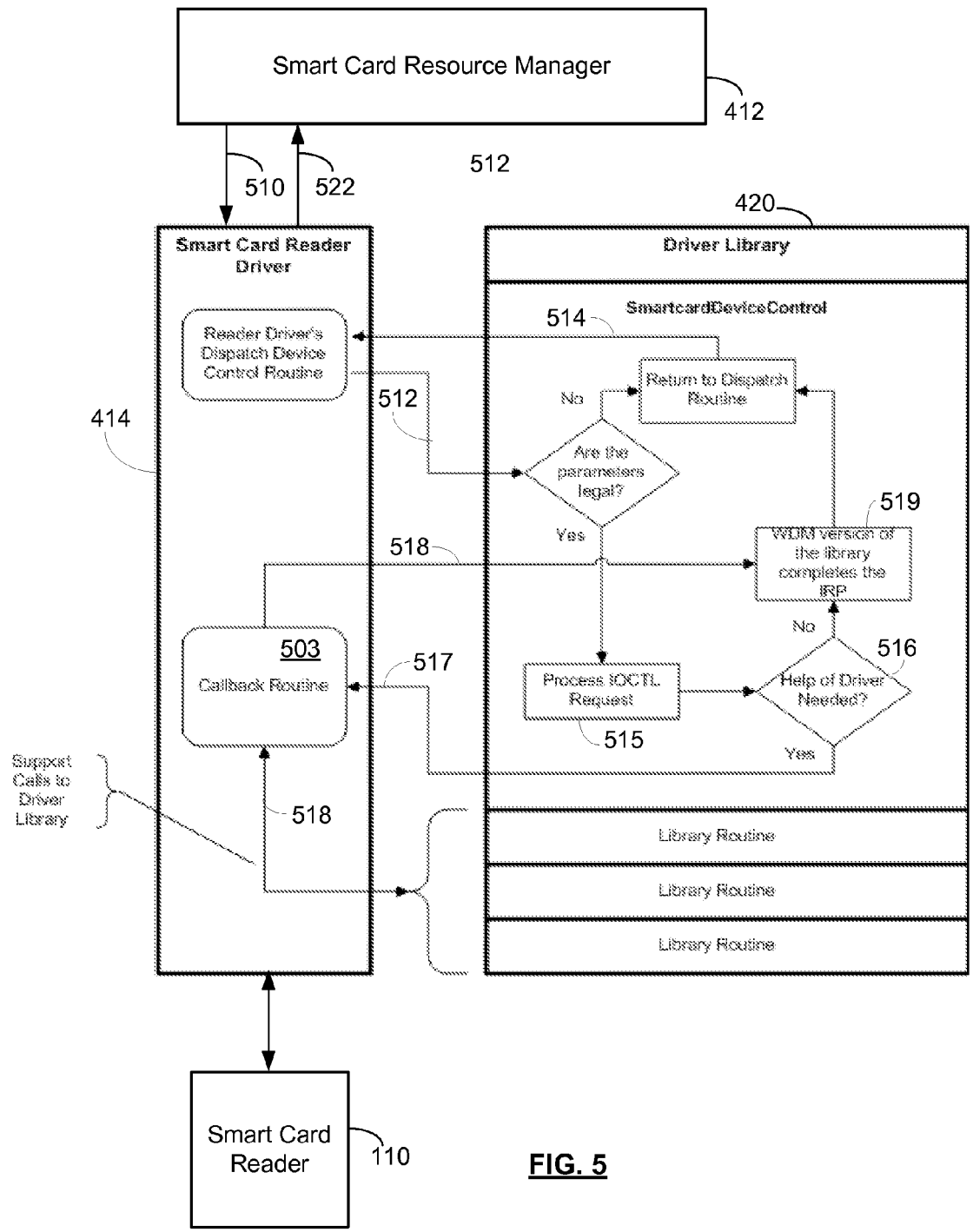
FIG. 5 shows in diagrammatic form the interaction between the smart card reader driver and the Windows smart card driver library in the smart card reader environment as shown in FIG. 4.

FIG. 5 illustrates generally an interaction between the smart card reader driver 414 and the Windows smart card driver library 420, for example as described by the DDK. With reference to FIG. 5, the steps that the reader driver 414 takes together with the supplied driver library 420 to process an I/O control request (IOCTL( )) are described. As indicated by reference 510, the smart card reader driver 414 receives an IOCTL( ) call from the smart card resource manager 412. The smart card reader driver 414 passes IOCTL control requests to a SmartcardDeviceControl driver library routine in the smart card driver library 420 (e.g., a Windows Driver Model (WDM) based driver), as indicated by reference 512. If the parameters that the smart card reader driver 414 passes to SmartcardDeviceControl are incorrect, SmartcardDeviceControl returns with an error message, as indicated by reference 514. In the WDM version of the driver library 420, SmartcardDeviceControl returns without completing the IRP if the parameters are incorrect. Typically, the parameters in the IRP are intended for a specific smart card action. The IRP is a structure for parameters associated with the specific action to be passed back and forth among the smart card resource manager 412, the smart card reader driver 414 and the smart card driver library 420. In the event that the parameters are incorrect, a status value inside the IRP indicates to the smart card resource manager 412 that the intended smart card action was not successfully completed.

If the parameters are correct, SmartcardDeviceControl processes the IOCTL request if it can (step 515). SmartcardDeviceControl then checks to see if the smart card reader driver 414 has a callback defined for the IOCTL( ) request that it is processing (step 516). If the callback exists, SmartcardDeviceControl calls the callback, as indicated by reference 517. The smart card reader driver 414 callback routine 503 then calls all the driver library routines that are required to complete the processing of the IOCTL, as indicated by reference 518. After processing the IOCTL( ) function, the callback routine returns to the SmartCardDeviceControl function, as indicated by reference 518. In the WDM version of the library, SmartcardDeviceControl completes the IRP that carried the IOCTL( ) as indicated by reference 519. SmartcardDeviceControl then returns control to the reader driver dispatch routine, as indicated by reference 514. The smart card reader driver 414 then returns the IOCTL( ) call to the smart card resource manager 412, as indicated by reference 522.

The smart card library driver 420 synchronizes access to the reader driver 414 so that no two callback functions are called at the same time. However, card insertion and removal event handling (e.g., when the smart card reader 110 indicates that the smart card 334 is either inserted into or removed from the storage interface 322, shown in FIG. 3) may be processed asynchronously.

Figure 6:
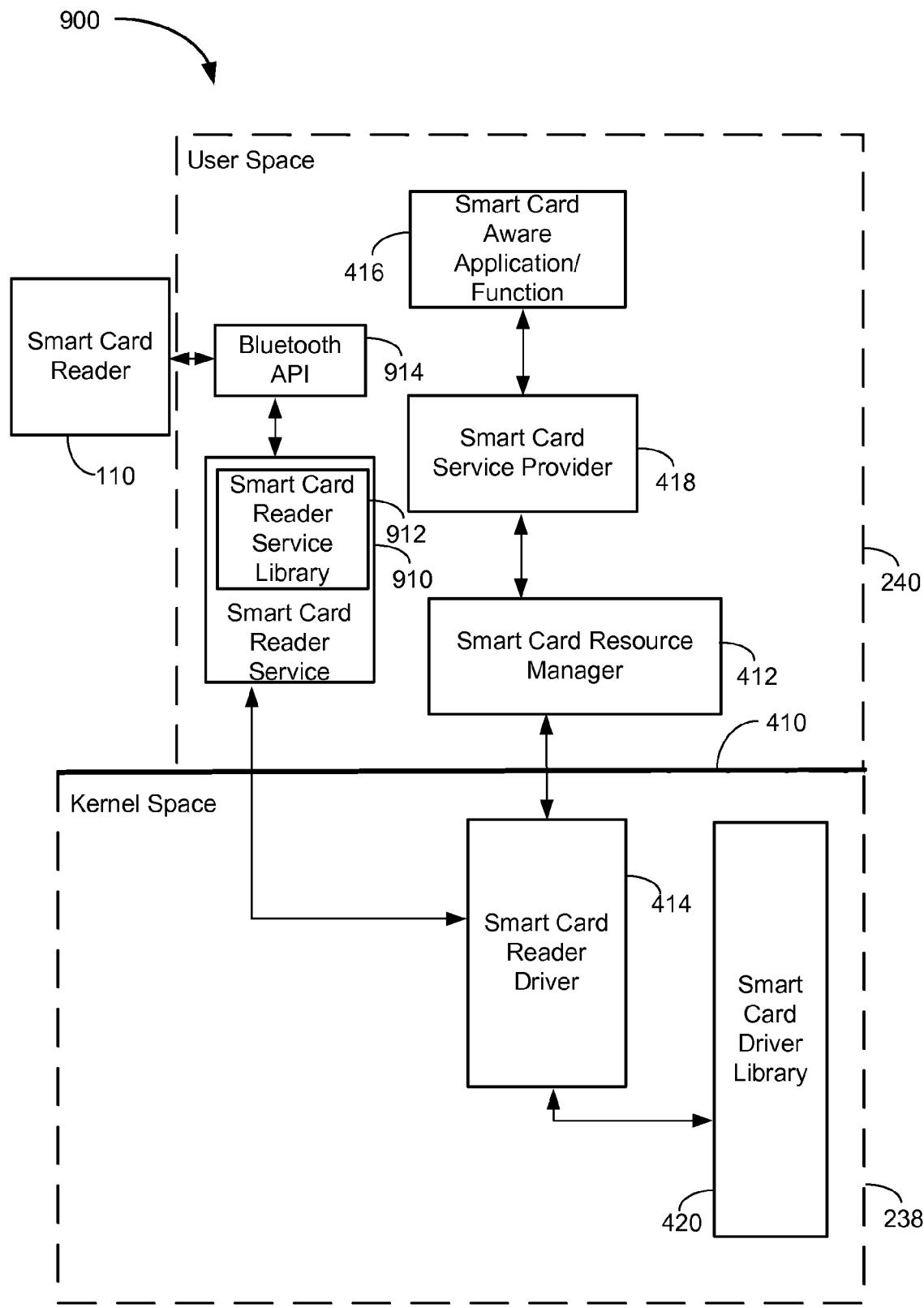
FIG. 6 shows in diagrammatic form a smart card reader environment.

Referring now to FIG. 6, another smart card reader environment 900 is illustrated in accordance with example embodiments of the present disclosure. The smart card environment 900 is similar to the environment 400 of FIG. 4, described above, except that in environment 900 a wireless air interface exists between the smart card reader 110 and the personal computer 100, rather than a wired interface as shown in FIG. 4. As indicated above user applications or functions 416 (e.g., such as Microsoft Outlook® or Microsoft Word® or Microsoft Windows Vista login function) typically reside in the user space 240, and drivers (including smart card reader driver 414) reside in the kernel space 238. In at least some example embodiments, placing a driver such as the smart card reader driver in the kernel space 238, as required by Microsoft Windows Vista, can raise the following possible issues: (a) the user interface components 248 cannot be directly accessed and/or displayed by code residing in the kernel space 238; and (b) the Bluetooth application programming interface (API), which is installed as one of the APIs 246 and is used to access the Bluetooth communications port (i.e., the short range communications subsystem 232), cannot be directly accessed from the kernel space 238. Since Bluetooth communications between the personal computer 100 and the smart card reader 110 would have to occur via the Bluetooth API, the Bluetooth API must be accessible to a smart card reader driver to be installed on the personal computer 100. The smart card reader driver to be used on the personal computer 100 also needs access to the UI components 248 so that a user of the personal computer 100 can input Bluetooth secure pairing keys using the UI components 248, as well as other information.

To address the above issues, the example embodiment shown in environment 900 of FIG. 6 includes a user space 240 application, referred to as a smart card reader service (SCRS) 910. The SCRS 910 is placed in the user space 240 and therefore has access to the Bluetooth API 914, as the APIs 246 also reside in the user space 240. Therefore, using the Bluetooth API 914, the SCRS 910 is capable of opening a Bluetooth communication port. The SCRS 910 takes messages from the Smart Card Reader Driver 414 and sends the messages to the smart card reader 110 through the Bluetooth communication port (e.g., using the short range communications subsystems 232 and 320). Since the SCRS 910 resides in the user space 240, the SCRS can make display calls to the user interface at any time, using the user interface components 248.

Turning again to environment 400 of FIG. 4 in which a wired interface (e.g. a USB connection) exists between the personal computer 100 and the smart card reader 110, in such an environment messages or data destined for the smart card reader 110 are passed from the smart card reader driver 414 through the driver stack to the USB or serial driver, since all the drivers 244 are located in the kernel space 238. The USB or serial driver then sends these messages to the smart card reader 110 over the serial connection. Turning back again to environment 900 of FIG. 6, in such an environment communication between the personal computer 100 and the smart card reader 110 is achieved via an air interface (e.g. a Bluetooth connection between short range communications subsystems 234 and 320). As the smart card reader driver 414 is located in the kernel space 238 and does not have access to Bluetooth drivers, messages are passed back into the user space 240 to the smart card reader service 910 and the available Bluetooth API 914 is used. Communication between the smart card reader driver 414 and the smart card reader service 910 is facilitated by a smart card reader service library 912. The smart card reader service library 912 includes a set of function calls that the smart card reader service 910 uses to communicate with the smart card reader driver 414.

In at least some example embodiments, commands are created and sent generally as follows: the smart card aware application or function 416 requests the smart card service provider 418 to create a command that is to be sent to the smart card 334. The smart card service provider 418 passes the command to the Windows smart card resource manager 412, which passes the command across the I/O control interface 410 to the smart card reader driver 414. The smart card reader driver 414 then passes the command on to the smart card driver library 420. The smart card driver library 420 uses a callback function to pass the command back to the smart card reader driver 414. This callback function notifies the smart card reader driver 414 that the smart card reader driver 414 is to send the command to the smart card reader 110 and wait for a response from the smart card reader 110. The smart card reader driver 414 then passes the command up to the smart card reader service 910 using commands and/or functions that are part of the smart card reader service library 912. The smart card reader service 910 sends the command over the Bluetooth connection (i.e., using the short range communications subsystem 232 and 320 shown in FIGS. 2 and 3) using the Bluetooth API 914 to the smart card reader 110. The smart card reader 110 then processes the command and returns the appropriate response. This response from the smart card reader 110 follows the same path, in reverse fashion, back to Microsoft Outlook (or the applicable smart card aware application 416). As will be described below, during login, two commands that can be sent to the smart card 334 using the just described command creation and sending process include a SET PROTOCOL COMMAND and a command Application Protocol Data Unit (APDU). The SET PROTOCOL command and APDU are standardized data structures for smart card systems, for example as defined by ISO 7816.

As indicated above, the smart card reader service library 912 includes a set of function calls that the smart card reader service 910 uses to communicate with the smart card reader driver 414. The smart card reader service 910 also uses the smart card reader service library 912 to communicate with the smart card reader 110, in order to perform certain functions or routines provided in the smart card reader service library 912.

Environment 900 will now be further explained in the context of the smart card two factor login authentication example mentioned above. In a smart card two factor authentication environment, when a user's desktop computer 100 operating under Microsoft Windows Vista is at the lock or login screen and receives a "smart card insertion notification message" from the smart card reader 110, the personal computer 100 will try to establish a communications channel with the user's smart card reader 110 in order to access security certificates that are located on the user's smart card 334 (which is inserted into the storage component interface 332 of the smart card reader 110), using the short range communications subsystems 232 (FIG. 2) and 320 (FIG. 3) as the means of connectivity between the personal computer 100 and the smart card reader 110. In the current example, when a "smart card insertion notification message" is received from the smart card reader 110 and the PC 100 is locked, Microsoft Windows Vista's login function sends a message to the Windows smart card service provider 418 requesting a communications channel be established to the specific smart card 334. The smart card service provider 418 then creates and sends commands to the smart card resource manager as required to facilitate the exchange among the Smart Card Resource Manager 412, Smart Card Reader Driver 414, Smart Card Reader Service 910 and Smart Card Reader. Included among the sent commands are those shown in FIG. 7 and described as follows:

(Step 1) The smart card resource manager 412 sends SET PROTOCOL command 650 to the smart card reader driver 414.

(Step 2) The smart card reader driver 414 sends the SET PROTOCOL command 651 to the smart card reader service 910.

(Step 3) The smart card reader service 910 then sends SET PROTOCOL command 652 over the wireless interface to smart card reader 110 and immediately (or soon after receiving the SET PROTOCOL command 651) responds to the smart card reader driver with a REPLY message 660 indicating that the SET PROTOCOL command was successfully received by the smart card 334, without waiting for a response from the smart card reader 110.

(Step 4) The smart card reader driver 414 passes on the successful REPLY message 662 to the smart card resource manager 412, thus enabling the smart card resource manager 412 (and ultimately Microsoft Windows Vista login function 416) to operate under the assumption that the SET PROTOCOL command was actually successfully executed by the smart card reader 110.

(Step 5) The smart card resource manager 412 generates an APDU command 670 and sends it to smart card reader driver 414.

(Step 6) The smart card reader driver 414 sends the APDU command 671 to the smart card reader service 910.

(Step 7) The smart card reader service 910 sends the APDU command 672 to the smart card reader 110.

(Step 8) Concurrent with one or more of the above Steps 3-7, the smart card reader 110 relays the SET PROTOCOL command 653 to the smart card 334, and as indicated at box 651, if the command fails at the smart card 334, the smart card reader 110 caches the negative result.

(Step 9) Upon receiving the APDU message 672, the smart card reader 110 checks the cached result of the SET PROTOCOL command 652 to determine if the SET PROTOCOL command 652 was successfully executed or failed.

(Step 10) If the SET PROTOCOL command was successfully executed, the smart card reader 110 passes on the APDU command 673 to the smart card 334, then receives the smart card response 680 to the APDU command; the smart card reader 110 then transmits the smart card response 681 to the smart card reader service 910, which provides the smart card response 682 to the smart card reader driver 414 which returns the smart card response 683 to the smart card resource manager 412. Thus, the messages within box 702 of FIG. 7 (Step 10) are carried out if the SET PROTOCOL command 652 was successfully executed by the smart card 334.

(Step 11) If the SET PROTOCOL command failed at the smart card level, the smart card reader 110 immediately responds to the APDU command 672 by sending a failure to execute APDU message 690 to the smart card reader service 910. The smart card reader service 910 passes the APDU failure message 691 on to the smart card reader driver 414, which then passes the APDU failure message 692 on to the smart card resource manager 412. Thus, the messages within box 704 of FIG. 7 (Step 11) are carried out if the SET PROTOCOL command 652 was failed at the smart card 334. After receiving the APDU failure message 692, Microsoft Windows Vista closes the session for the smart card 334, thus requiring the user to remove and reinsert the smart card 334 into the smart card reader 110 to have Microsoft Windows Vista attempt to re-open a communications channel with the card.

As noted previously, when Microsoft Windows Vista does not receive a timely response to a SET PROTOCOL command, a timeout occurs with an ensuing "No Certificates Found on Smart Card" message. This can be particularly problematic when the smart card reader connects to the PC through a wireless link. The method illustrated in FIG. 7 can alleviate this problem because a successful reply is sent back to the operating system by the smart card reader service 910 without actually waiting to see if the SET PROTOCOL command is successfully executed by the smart card 334. If the SET PROTOCOL command did indeed fail at the smart card level, the fact that a failure has occurred at some level can be passed back to the operating system in the subsequent APDU failure notification message. The method represented in FIG. 7 can also provide a speed improvement in the session initialization process as the PC does not have to wait for the SET PROTOCOL command to actually be sent, processed and received back from the smart card reader.

Another alternative example embodiment will now be described with reference to FIG. 8, which achieves results similar to the method represented in FIG. 7 but in a different manner—in particular in the embodiment of FIG. 8, caching of the failure of the SET PROTOCOL and the subsequent decision making is done at the Smart Card Reader Service 910 rather than the Smart card reader 110:

(Step 1) The smart card resource manager 412 sends SET PROTOCOL command 650 to the smart card reader driver 414.

(Step 2) The smart card reader driver 414 sends the SET PROTOCOL command 651 to the smart card reader service 910.

(Step 3) The smart card reader service 910 then sends SET PROTOCOL command 652 over the wireless interface to smart card reader 110 and immediately (or soon after receiving the SET PROTOCOL command 651) responds to the smart card reader driver with a REPLY message 660 indicating that the SET PROTOCOL command was successfully received by the smart card 334, without waiting for a response from the smart card reader 110.

(Step 4) The smart card reader driver 414 passes on the successful REPLY message 662 to the smart card resource manager 412, thus enabling the smart card resource manager 412 (and ultimately Microsoft Windows Vista login function 416) to operate under the assumption that the SET PROTOCOL command was actually successfully executed by the smart card reader 110.

(Step 5) While (or shortly after) the smart card reader driver sends a successful REPLY 660 to the smart card reader driver 414, the smart card reader 110 receives the SET PROTOCOL command 652 and sends the SET PROTOCOL command 653 to the smart card 334, and subsequently receives a REPLY 663 indicating if the SET PROTOCOL command 653 was successfully executed or not. A corresponding REPLY message 664 is sent over the air interface from the smart card reader 110 to the smart card reader service 910, which, as indicated at box 651, caches the negative result if the REPLY message 664 indicates a SET PROTOCOL failure.

(Step 6) The smart card resource manager 412 generates an APDU command 670 and sends it to smart card reader driver 414.

(Step 7) The smart card reader driver 414 sends the APDU command 671 to the smart card reader service 910.

(Step 8) Upon receiving the APDU message 671, the smart card reader service 110 checks the cached result of the SET PROTOCOL REPLY message 664 to determine if the SET PROTOCOL command 653 was successfully executed or failed.

(Step 9) If the SET PROTOCOL command was successfully executed, the smart card reader service 910 passes on the APDU command 672 to the smart card reader 110, which in turn passes on APDU command 673 to the smart card 334, then receives the smart card response 680 to the APDU command; the smart card reader 110 then transmits the smart card response 681 to the smart card reader service 910, which provides the smart card response 682 to the smart card reader driver 414 which returns the smart card response 683 to the smart card resource manager 412. Thus, the messages within box 702 of FIG. 8 (Step 10) are carried out if the SET PROTOCOL command 652 was successfully executed by the smart card 334.

(Step 11) If the SET PROTOCOL command failed at the smart card level, the smart card reader service 910 immediately responds to the APDU command 671 by sending a failure to execute APDU message 691 to the smart card reader driver 414. The smart card reader driver 414 passes the APDU failure message 692 on to the smart card resource manager 412. Thus, the messages within box 704 of FIG. 8 (Step 11) are carried out if the SET PROTOCOL command 652 was failed at the smart card 334. After receiving the APDU failure message 692, Microsoft Windows Vista closes the session the smart card 334, thus requiring the user to remove and reinsert the smart card 334 into the smart card reader 110 to have Microsoft Windows Vista attempt to re-open a communications channel with the card.

Another alternative example embodiment will now be described with reference to FIG. 9, which achieves results similar to the method represented in FIGS. 7 and 8 but in a different manner:

(Step 1) The smart card resource manager 412 sends SET PROTOCOL command 650 to the smart card reader driver 414.

(Step 2) The smart card reader driver 414 sends SET PROTOCOL command 651 to the smart card reader service 910.

(Step 3) The smart card reader service 910 then caches the SET PROTOCOL command as indicated in box 810 and immediately (or soon after receiving the SET PROTOCOL command 651) responds to the smart card reader driver 414 with a REPLY message 660 indicating that the SET PROTOCOL command was successfully received by the smart card 334 (even though the SET PROTOCOL has not yet been sent).

(Step 4) The smart card reader driver 414 passes on the successful REPLY message 662 to the smart card resource manager 412, thus enabling the smart card resource manager 412 (and ultimately Microsoft Windows Vista login function 416) to operate under the assumption that the SET PROTOCOL command was actually successfully executed by the smart card reader 110.

(Step 5) The smart card resource manager 412 generates an APDU command 670 and sends it to smart card reader driver 414.

(Step 6) The smart card reader driver 414 sends the APDU command 671 to the smart card reader service 910.

(Step 7) The smart card reader service 910 sends a packet that includes both the previously cached "SET PROTOCOL" command and the APDU command 672 to the smart card reader 110.

(Step 8) The smart card reader 110 relays the SET PROTOCOL command 653 to the smart card 334, and then checks to see if it successfully executes or if it fails. (Step 9) If the SET PROTOCOL command was successfully executed, the smart card reader 110 passes on the APDU command 673 to the smart card 334, then receives the smart card response 680 to the APDU command; the smart card reader 110 then transmits the smart card response 681 to the smart card reader service 910, which provides the smart card response 682 to the smart card reader driver 414 which returns the smart card response 683 to the smart card resource manager 412. Thus, the messages within box 702 of FIG. 9 (Step 9) are carried out if the SET PROTOCOL command 652 was successfully executed by the smart card 334.

(Step 10) If the SET PROTOCOL command failed at the smart card level, the smart card reader 110 immediately responds to the APDU command 672 by sending a failure to execute APDU message 690 to the smart card reader service 910. The smart card reader service 910 passes the APDU failure message 691 on to the smart card reader driver 414, which then passes the APDU failure message 692 on to the smart card resource manager 412. Thus, the messages within box 704 of FIG. 9 (Step 10) are carried out if the SET PROTOCOL command 652 was failed at the smart card 334. After receiving the APDU failure message 692, Microsoft Windows Vista closes the session the smart card 334, thus requiring the user to remove and reinsert the smart card 334 into the smart card reader 110 to have Microsoft Windows Vista attempt to re-open a communications channel with the card.

Figure 7:
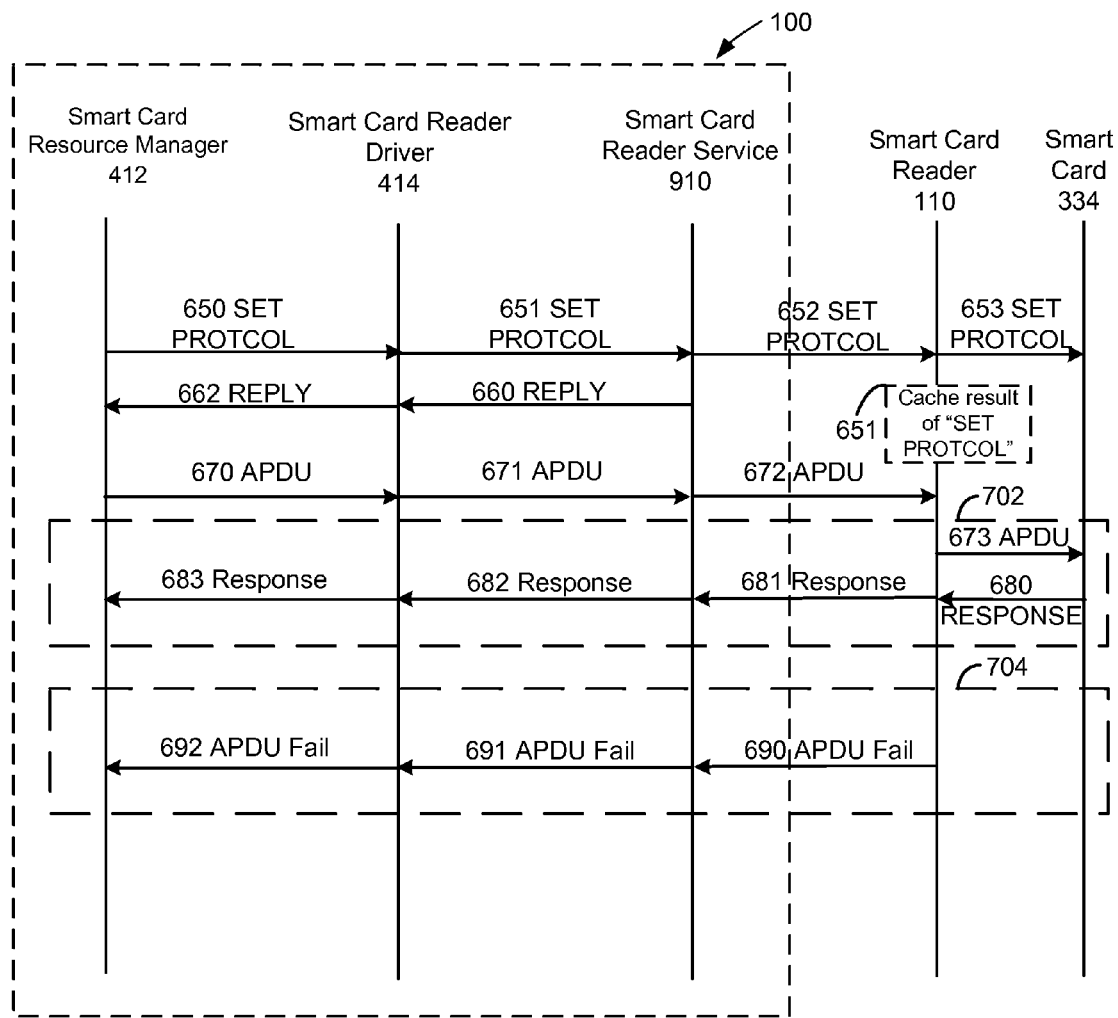
FIG. 7 shows an example conversation among a smart card resource manager, a vendor supplied smart card reader driver, the smart card reader service and a smart card reader illustrating a smart card set protocol optimization method according to one example embodiment.
Figure 8:
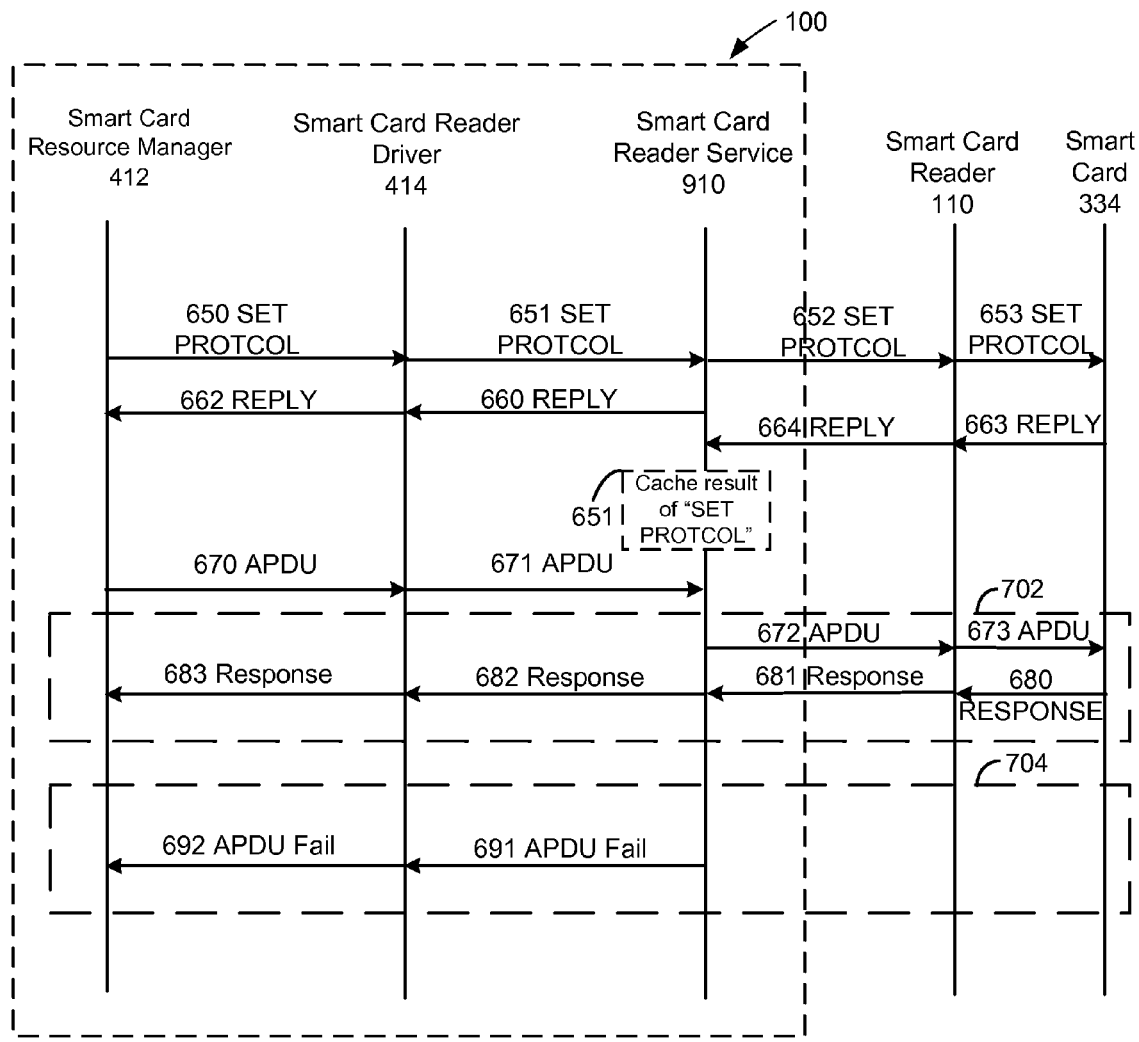
FIG. 8 shows an example conversation among a smart card resource manager, a vendor supplied smart card reader driver, the smart card reader service and a smart card reader illustrating a smart card set protocol optimization method according to another example embodiment.
Figure 9:
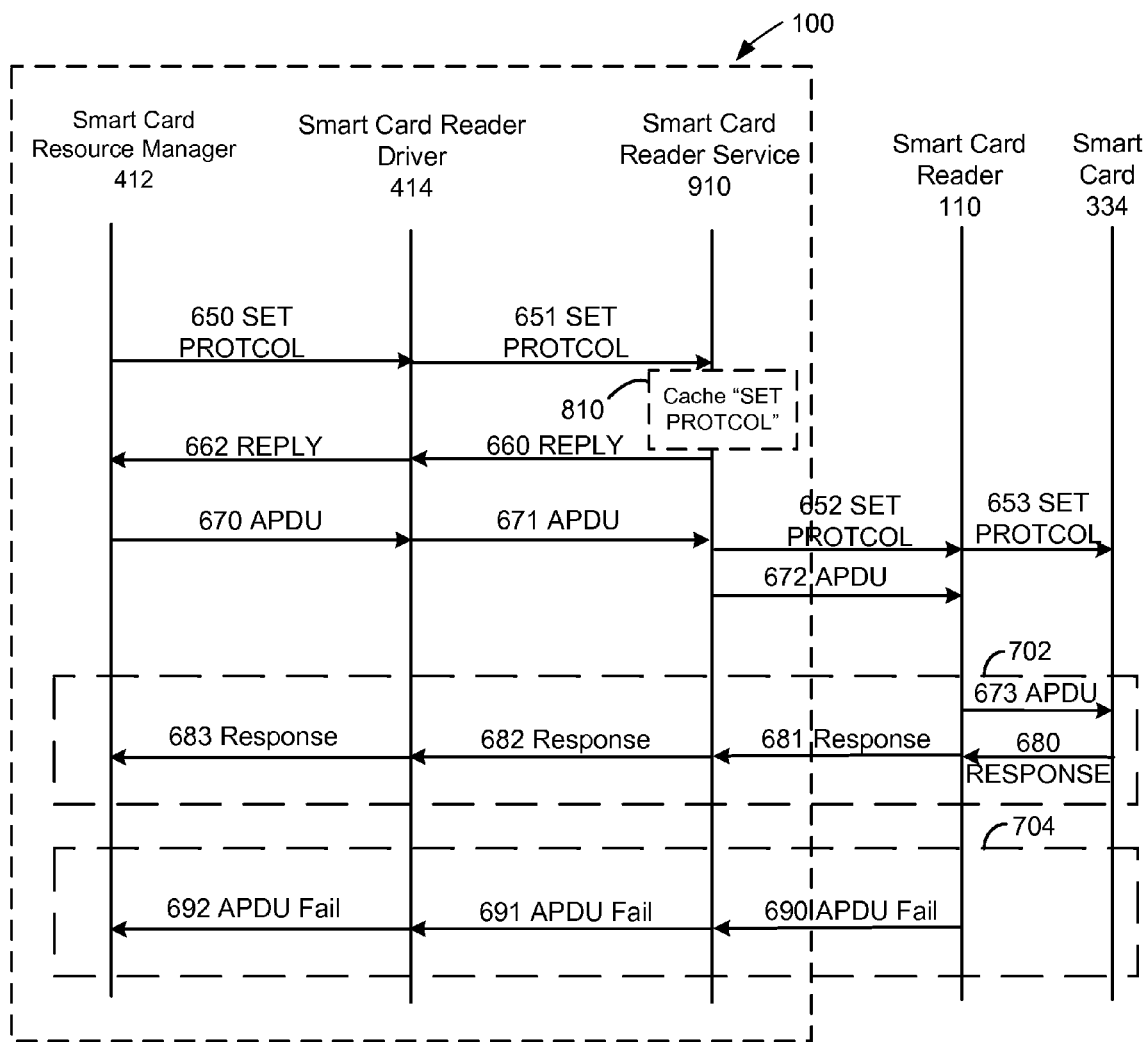
FIG. 9 shows an example conversation among a smart card resource manager, a vendor supplied smart card reader driver, the smart card reader service and a smart card reader illustrating a smart card set protocol optimization method according to another example embodiment.

Unlike the method shown in FIG. 7, the method of FIG. 8 does not require special configuration of the smart card reader 110 as the smart card reader service 910 performs the caching function and related decision making as to which communications option 702 or 704 is to be carried out. Although the methods illustrated in FIGS. 7, 8 and 9 have been described in the context of the Microsoft Windows Vista operating system, they could also be applied to other operating system environments.

In at least some example embodiments, the SET PROTOCOL command is not the very first command that is generated for sending to the smart card reader 110 after the personal computer 100 receives a smart card insertion notification message. Rather, other messages may be generated and sent by the personal computer 100 prior to sending of the SET PROTOCOL command, including for example a Cold Reset command.

Note that the smart card reader 110 may be configured in some embodiments to send a smart card insertion notification message to the personal computer 100 even if the smart card 334 was not just inserted into the smart card reader 110. For example, in one embodiment, card insert/card removal messages are used not only in the conventional sense (i.e. when a smart card has been physically inserted into or removed from the smart card reader 110) but also to share access to the smart card reader 110. For example, in an embodiment where the smart card reader can pair with or communicate with two different applications or devices (for example a personal computer and a mobile communications device), the smart card reader 110 will send a card removal message to one application/device, which forces that application or device to stop sending messages to the smartcard reader 110. At the same time, the smart card reader 110 will send a card insert message to another application/device thereby allowing the other application/device to send messages to the smart card reader 110.

The above-described embodiments of the present application are intended to be examples only. Alterations, modifications and variations may be effected to the particular embodiments by those skilled in the art without departing from the scope of the application.

What is claimed is:

1. A method in a smart card reader service of a computer device of facilitating communications between the computer device and a smart card reader having an associated smart card, the smart card reader service acting as a relay for commands between a smart card resource manager of the computer device and the smart card reader, the method comprising:

receiving, from the smart card resource manager, a first command destined for the smart card, the first command for setting a protocol for communications with the smart card;

prior to receiving, via the smart card reader, any reply from the smart card to the first command, responding to the smart card resource manager with a message indicating that the smart card has successfully received the first command;

relaying the first command to the smart card reader through a wireless communication link;

receiving, from the smart card resource manager, a second command destined for the smart card;

relaying the second command to the smart card reader through the wireless communication link;

receiving, from the smart card reader through the wireless communication link, a response to the second command; and relaying the response to the smart card resource manager, wherein, responsive to the first command having failed at the smart card, the response includes an indication of failure of the second command at the smart card.

2. A method in a smart card reader service of a computer device of facilitating communications between the computer device and a smart card reader having an associated smart card, the smart card reader service acting as a relay for commands between a smart card resource manager of the computer device and the smart card reader, the method comprising:

receiving, from the smart card resource manager, a first command destined for the smart card, the first command for setting a protocol for communications with the smart card;

prior to receiving, via the smart card reader, any reply from the smart card to the first command, responding to the smart card resource manager with a message indicating that the smart card has successfully received the first command;

relaying the first command to the smart card reader through a wireless communication link;

receiving an indication from the smart card reader of whether the first command failed at the smart card;

receiving, from the smart card resource manager, a second command destined for the smart card;

responsive to the first command having failed at the smart card, sending the smart card resource manager a response indicating that the second command failed; and responsive to the first command not having failed at the smart card, relaying the second command to smart card reader, receiving a response to the second command from the smart card reader and relaying the response to the second command to the smart card resource manager.

3. The method of claim 2, further comprising:

upon receiving, from the smart card reader, an indication of failure for the first command at the smart card, caching the failure indication.

4. A method in a smart card reader service of a computer device of facilitating communications between the computer device and a smart card reader having an associated smart card, the smart card reader service acting as a relay for commands between a smart card resource manager of the computer device and the smart card reader, the method comprising:

receiving, from the smart card resource manager, a first command destined for the smart card, the first command for setting a protocol for communications with the smart card;

prior to receiving, via the smart card reader, any reply from the smart card to the first command, responding to the smart card resource manager with a message indicating that the smart card has successfully received the first command;

caching the first command;

monitoring for a second command destined for the smart card to be received from the smart card resource manager;

after receiving the second command, relaying both the first command and the second command to the smart card reader through a wireless communication link;

receiving from the smart card reader through the wireless communication link a response to the second command; and relaying the response to the smart card resource manager.

5. The method of claim 4, wherein, responsive to the first command having failed at the smart card, the response includes an indication of failure of the second command at the smart card.

6. The method of claim 4, wherein, responsive to the first command not having failed at the smart card, the response to the second command is issued by the smart card.

7. A method in a smart card reader of facilitating communications between a computer device and an associated smart card, the method comprising:

receiving, from a smart card reader service of the computer device, a first command destined for the smart card, the first command for setting a protocol for communications with the smart card;

providing the first command to the smart card;

receiving an indication from the smart card of whether the first command failed at the smart card;

subsequently to receiving the indication, receiving, from the smart card reader service, a second command destined for the smart card;

responsive to the first command having failed at the smart card, sending the smart card reader service a response indicating that the second command failed; and responsive to the first command not having failed at the smart card, providing the second command to the smart card, receiving a response to the second command from the smart card and sending the response to the second command to the smart card reader service.

8. The method of claim 7, further comprising:

upon receiving an indication from the smart card of failure for the first command, caching the failure indication.

9. The method of claim 7, wherein the second command comprises an application protocol data unit (APDU).

10. A method in a smart card reader of facilitating communications between a computer device and an associated smart card, the method comprising:

receiving, from a smart card reader service of the computer device, a first command destined for the smart card and a second command destined for the smart card, the first command for setting a protocol for communications with the smart card;

providing the first command but not the second command to the smart card;

receiving an indication from the smart card of whether the first command failed at the smart card;

responsive to the first command having failed at the smart card, sending the smart card reader service a response indicating that the second command failed; and responsive to the first command not having failed at the smart card, providing the second command to the smart card, receiving a response to the second command from the smart card and sending the response to the smart card reader service.

11. The method of claim 10, wherein the second command comprises an application protocol data unit (APDU).

12. A computer device for communicating over a wireless communications link with a smart card reader having an associated smart card, the computer device comprising:

a smart card resource manager for generating commands for the smart card reader;

a smart card reader service for relaying commands received from the smart card resource manager for the smart card reader, the smart card reader service being configured to:

receive, from the smart card resource manager, a first command destined for the smart card, the first command for setting a protocol for communications with the smart card;

prior to receiving, via the smart card reader, any reply from the smart card to the first command, respond to the smart card resource manager with a message indicating that the smart card has successfully received the first command, relay the first command to the smart card reader through a wireless communication link;

receive, from the smart card resource manager, a second command destined for the smart card;

relay the second command to the smart card reader through the wireless communication link;

receive, from the smart card reader through the wireless communication link, a response to the second command; and relay the response to the smart card resource manager, wherein, responsive to the first command having failed at the smart card, the response includes an indication of failure of the second command at the smart card.

13. A computer device for communicating over a wireless communications link with a smart card reader having an associated smart card, the computer device comprising:

a smart card resource manager for generating commands for the smart card reader;

a smart card reader service for relaying commands received from the smart card resource manager for the smart card reader, the smart card reader service being configured to:

receive, from the smart card resource manager, a first command destined for the smart card, the first command for setting a protocol for communications with the smart card;

prior to receiving, via the smart card reader, any reply from the smart card to the first command, respond to the smart card resource manager with a message indicating that the smart card has successfully received the first command;

relay the first command to the smart card reader through a wireless communication link;

receive an indication from the smart card reader of whether the first command failed at the smart card;

receive, from the smart card resource manager, a second command destined for the smart card;

responsive to the first command having failed at the smart card, send the smart card resource manager a response indicating that the second command failed; and responsive to the first command not having failed at the smart card, relay the second command to smart card reader, receive a response to the second command from the smart card reader and relay the response to the second command to the smart card resource manager.

14. A computer device for communicating over a wireless communications link with a smart card reader having an associated smart card, the computer device comprising:

a smart card resource manager for generating commands for the smart card reader;

a smart card reader service for relaying commands received from the smart card resource manager for the smart card reader, the smart card reader service being configured to:

receive, from the smart card resource manager, a first command destined for the smart card, the first command for setting a protocol for communications with the smart card;

prior to receiving, via the smart card reader, any reply from the smart card to the first command, respond to the smart card resource manager with a message indicating that the smart card has successfully received the first command;

cache the first command;

monitor for a second command destined for the smart card to be received from the smart card resource manager;

after receiving the second command, relay both the first command and the second command to the smart card reader through a wireless communication link;

receive from the smart card reader through the wireless communication link a response to the second command; and relay the response to the smart card resource manager.

15. The device of claim 14, wherein, responsive to the first command having failed at the smart card, the response includes an indication of failure of the second command at the smart card.

16. The device of claim 14, wherein, responsive to the first command not having failed at the smart card, the response to the second command is issued by the smart card.

17. A smart card reader for facilitating communications between a computer device and an associated smart card, the smart card reader comprising:

a smart card interface for interfacing with the smart card;

a communications system for exchanging signals with the computer device; and a controller connected to the smart card interface and to the communications system, the controller being configured to:

receive, from a smart card reader service of the computer device, a first command destined for the smart card, the first command for setting a protocol for communications with the smart card;

provide the first command to the smart card;

receive an indication from the smart card of whether the first command failed at the smart card;

receive, from the smart card reader service, a second command destined for the smart card, subsequently to receiving the indication;

send the smart card reader service a response indicating that the second command failed, responsive to the first command having failed at the smart card; and provide the second command to the smart card, responsive to the first command not having failed at the smart card, receive a response to the second command from the smart card and send the response to the second command to the smart card reader service.

18. The smart card reader of claim 17, the controller being further configured to:

cache the failure indication, upon receiving an indication from the smart card of failure for the first command.

19. The smart card reader of claim 17, wherein the second command comprises an application protocol data unit (APDU).

20. A smart card reader for facilitating communications between a computer device and an associated smart card, the smart card reader comprising:

a smart card interface for interfacing with the smart card;

a communications system for exchanging signals with the computer device; and a controller connected to the smart card interface and to the communications system, the controller being configured to:

receive, from a smart card reader service of the computer device, a first command destined for the smart card and a second command destined for the smart card, the first command for setting a protocol for communications with the smart card;

provide the first command but not the second command to the smart card;

receive an indication from the smart card of whether the first command failed at the smart card;

send the smart card reader service a response indicating that the second command failed, responsive to the first command having failed at the smart card; and provide the second command to the smart card, responsive to the first command not having failed at the smart card, receive a response to the second command from the smart card and send the response to the smart card reader service.

21. The smart card reader of claim 20, wherein the second command comprises an application protocol data unit (APDU).

* * * * *